United States Patent [19] [11] Patent Number: 5,155,307
Breed et al. [45] Date of Patent: Oct. 13, 1992

[54] PASSENGER COMPARTMENT CRASH SENSORS

[75] Inventors: David S. Breed, 270 Hillerest Rd., Boonton Township, Morris County, N.J. 07005; Vittorio Castelli, Yorktown Heights, N.Y.; Anthony S. Pruszenski, Jr., Plum Island, Mass.; Chingyao Chan, Morris Plains, N.J.

[73] Assignee: David S. Breed, Boonton Township, Morris County, N.J.

[21] Appl. No.: 480,271

[22] Filed: Feb. 15, 1990

Related U.S. Application Data

[63] Continuation-in-part of Ser. No. 314,603, Feb. 23, 1989, abandoned.

[51] Int. Cl.⁵ ............................................. H01H 35/14
[52] U.S. Cl. ..................... 200/61.45 R; 200/61.45 M; 200/61.48; 200/61.49
[58] Field of Search ..................... 200/61.45 R–61.53; 73/517 R, 516 B; 307/10 R

[56] References Cited

U.S. PATENT DOCUMENTS

| | | | |
|---|---|---|---|
| 3,974,350 | 8/1976 | Breed | 200/61.53 |
| 4,028,516 | 6/1977 | Hirashima et al. | 200/61.49 X |
| 4,201,898 | 5/1980 | Jones et al. | 200/61.48 X |
| 4,249,046 | 2/1981 | Livers et al. | 200/61.48 X |
| 4,262,177 | 4/1981 | Paxton et al. | 200/61.51 X |
| 4,321,438 | 3/1982 | Emenegger | 200/61.5 X |
| 4,329,549 | 5/1982 | Breed | 200/61.53 X |
| 4,362,913 | 12/1982 | Kumita et al. | 200/61.45 R |
| 4,816,627 | 3/1989 | Janotik | 200/61.53 X |
| 4,900,880 | 2/1990 | Breed | 200/61.53 |
| 4,902,861 | 2/1990 | Cook | 200/61.51 |
| 4,932,260 | 6/1990 | Norton | 73/517 R |

Primary Examiner—J. R. Scott
Attorney, Agent, or Firm—Sprung Horn Kramer & Woods

[57] ABSTRACT

This invention includes crash sensors designed to be used for frontal impact sensing and the strategies of using these sensors. It is analyzed and shown that velocity sensing or damped sernsors are desirable for frontal impact passenger compartment sensing. inertially damped sensors, with a damping force proportional to the square of velocity, is preferred for some applications. In other cases a viscous damped sensor is appropriate and in a few cases an undamped spring mass sensor will suffice. Such sensors can be made of plastic and in the shape of short housings. A preferred embodiment of this invention utilizes a swinging mass hinged to a housing as the sensing mass. Different geometries of the mass and the housing are disclosed and used to improve the performance of such sensors. These flapper mass sensors are useful for sensing frontal impacts in the passenger compartment both as primary sensors and as single or dual contact arming sensors. A method of manufacturing these sensors is also disclosed, in which the contacts are treated to become adhesive to plastic and then molded with the remaining plastic parts of the sensors. The plastic parts are then welded to form a hermetically-sealed interior of the sensor.

18 Claims, 14 Drawing Sheets

PASSENGER COMPARTMENT CRASH SENSORS

CROSS REFERENCE TO RELATED APPLICATION

This application is a continuation-in-part of application Ser. No. 314,603, filed Mar. 23, 1989 for "Side Impact Sensors", now abandoned.

This application is related to application Ser. No. 480,273 filed concurrently with this application, for "Side Impact Sensors" which is a continuation-in-part of application Ser. No. 314,603 filed Mar. 23, 1989 now abandoned.

This application is also related to application Ser. No. 480,257, filed concurrently with this application, for "Frontal Impact Crush Zone Sensors".

BACKGROUND OF THE INVENTION

This invention is related to a new design of and manufacturing method for crash sensors. In patent application Ser. No. 480,273 mentioned above, it is disclosed that a crash sensor can be constructed with a configuration of a square or rectangular flapper swinging inside a closed passage. It is also indicated that such sensors can be made of plastic by a molding process. This present invention provides further improvements on the previous design.

Current crash sensors can be classified into several categories: spring-mass, crush switch, electronic, and gas-damped. This invention is mainly in the last group although it is also applicable to spring mass sensors. A sensing mass in the shape of a flapper is disclosed in the aforementioned patent application. The flapper is coupled with and arranged to move in a housing. The flapper is biased by a spring or magnet toward a first position in the housing. When the sensor is installed on an appropriate location on a vehicle and a crash occurs, the flapper moves toward a second position in the housing. If the crash pulse is of enough magnitude and duration, an electrical circuit is then closed to initiate the protection apparatus associated with the sensing device. During the motion of the flapper, gas is forced to flow through the gap between the flapper and the housing. Due to the sharp edge of the flapper and the small surface area involved in the flow path, the viscous effect is negligible and the gas flow is of inertial type. The characteristic of an inertial flow through an orifice is that the flow velocity is proportional to the square root of the pressure difference across the orifice. This can be alternatively stated that the damping force on the mass is proportional to its velocity squared. This is in contrast to viscosity limited flow where the damping in proportional to the first power of the mass velocity.

One advantage of using inertial gas flow in a sensor is that the gas flow rate is not viscosity dependent. Since gas viscosity is sensitive to temperature variations, the performance of sensors utilizing viscous type of gas flow is significantly influenced by temperature changes. In inertially-damped sensors, the gas flow rate is a function of the pressure difference across the orifice and gas density only. As long as the gas density inside a sensor is kept constant, the behavior of the sensor is much less sensitive to temperature variations than viscously-damped sensors. In order to maintain a constant gas density inside the sensor, the interior of a sensor must be isolated or "hermetically" sealed from the ambient environment. The construction of this invention adapts a design that allows the manufacture of hermetically-sealed crash sensors. A "hermetically-sealed" sensor is defined here as a sensor, which has no openings to the atmosphere and only allows a negligible amount of gas to enter into or escape from its interior over a considerable period. For example, if a sensor is made of plastic and sealed from the atmosphere, the only leakage that can occur is gas diffusion through the plastic material or along the seams or metal to plastic joints.

The configuration of some of the sensors disclosed in the patent application Ser. No. 480,273 consists of a rectangular flapper and a rectangular housing. A flapper, which is the sensing mass for sensing the acceleration of the crash, is a planer member having a thickness in the sensing direction which is much less than its width or height and is arranged to rotate relative to the housing. The flapper is coupled with the housing by a thin hinge on the edge of the flapper, by a knife edge support or other means. The axis of the housing is parallel to or aligned with the desired crash detecting direction. For example, if the sensor is to be used for frontal impact sensing, the sensor should be installed to have the axis of the housing approximately parallel to the front-rear direction of the vehicle. The flapper is arranged to rotate along an axis perpendicular to the axis of the housing.

The parts of the sensor of this invention can be manufactured by the plastic injection molding processes, in which the flapper, the hinge, and the housing are formed in a single piece. If the hinge in made form the same plastic as used for the flapper and the housing, then they can be formed in a single molding process. On the other hand, if the hinge is made from another material, such as metal or a different plastic, it can be formed into its shape first and then insert molded with the plastic parts. The contacts comprising the switching circuit for the sensor are also to be insert molded into the housing. To ensure that the sensor is hermetically sealed, the metallic parts can be first coated by a bonding material which adheres to both the contacts and the plastic. It is known that the contacts and the plastic have different thermal expansion coefficients and thus, if they are not treated, they could separate when the temperature changes and result in leaks. One coating material which is resilient and adhesive and prevents the separation of the metal and plastic materials within the normal crash sensor operating temperature range, usually specified at $-40°$ F. to $250°$ F., is disclosed in U.S. Pat. No. 3,522,575 of Watson et al and is new to the field of crash sensors. The coating material mentioned in the Watson patent is a phenolic resin with 6 percent content of polyvinyl chloride. This manufacturing method not only eliminates the need of additional assembly steps, but also provides the hermetical sealing for the sensors.

The sealing of the sensor from the ambient environment is important to keep the gas density constant inside the sensor which renders the sensor insensitive to temperature changes. Furthermore, it can also isolate the interior of the sensor from dust and moisture which could interfere with the motion of the flapper or the flow of the gas through the orifice. With this new technique, therefore, the sensor can be assured of a long and reliable life which is very important for automotive safety system components.

SUMMARY OF THE INVENTION

It is the primary objective of this invention to provide a new and reliable design for crash sensors for mounting in the passenger compartment.

It is another objective of this invention to eliminate cross-axis problems associated with the present day crash sensors.

It is also the objective of this invention to manufacture the major parts of the crash sensor by a plastic molding process.

It is an additional objective of this invention to have the contacts of a sensor insert molded with the body of the sensor in a single molding process.

It is a further objective of this invention to simplify the manufacturing process to produce crash sensors in large quantities.

It is an additional objective of this invention to provide hermetic sealing to crash sensors by applying a metal-plastic bonding surface treatment to the contacts.

It is still another objective of this invention to make crash sensors which are insensitive to temperature variations.

It is another object of this invention to provide a damped crash sensor based on inertial gas flow.

BRIEF DESCRIPTION OF THE DRAWINGS

FIG. 11A shows the contacts as formed before insertion into the mold.

FIG. 11B shows the contacts molded into a single, extended piece with the plastic parts of the sensor.

FIG. 11C shows the sensor in its final form with the parts bent into their proper positions.

DETAILED DESCRIPTION OF PREFERRED EMBODIMENTS

Figure 1:
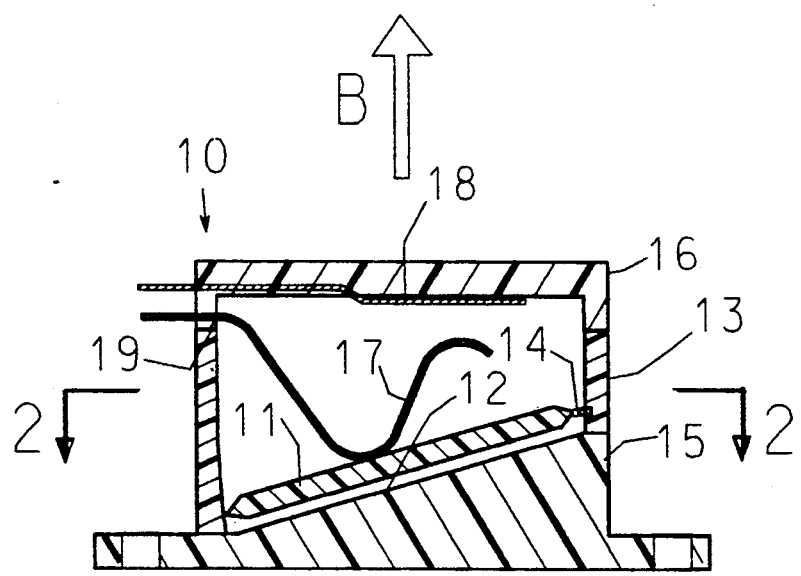
FIG. 1 is a cross section view of a square plastic inertially damped arming or passenger compartment discriminating sensor containing an integral molded hinge.

A preferred embodiment of this invention is manufactured as a short housing with a width of 1 to 2 inches, and a thickness of 0.5 to 0.75 inch. FIG. 1 is a cross sectional view of such a passenger compartment discriminating sensor 10. An inertial mass flapper 11, initially resting on an inclined surface 12, is hinged to the inside surface of a housing 13 by a plastic hinge 14. The housing 13 is comprised of a left casing 15 and a right casing 16. A first contact 17, attached to housing 13, biases the flapper 11 toward its initial position. A second contact 18 is also fixed to the housing 13. When installed on a vehicle, the right side of the sensor faces the front of the vehicle in the direction of arrow B.

When the sensor is subjected to a crash pulse of enough magnitude and duration, the flapper moves toward contact 18. After a specified travel, the first contact 17 makes contact with 18 and closes an electrical circuit to initiate the protection apparatus associated with the sensing system. The first contact is flexible and allowed to deflect further beyond the triggering position. Therefore, the flapper can travel over the triggering position until it is stopped by the wall of the housing. This over travel is necessary in order to provide a long contact duration or dwell. If the acceleration of the crash pulse drops below the bias level later in the crash, the flapper moves back toward its initial position due to the biasing force.

Flapper 11 and the left housing casing 15 can be produced as a single plastic piece by injection molding. The flapper and the housing are attached by a plastic hinge formed in the manufacturing process. A candidate for the plastic material with well known hinge moving properties is polypropylene, which is strong and durable enough to provide a flexible bonding between the flapper and the housing. Alternatively a hinge of another material can be insert molded into the plastic parts in place of the plastic hinge. Still another preferred method is to make the plastic parts from a glass-filled polycarbonate material. In this case the hinge would also be formed from polycarbonate material but without the glass filling since the glass in the hinge area would make the hinge brittle and too resistant to bending. The hinge would be formed by injecting the non-glass filled material in the area of the hinge using techniques known to those skilled in plastic molding.

The right side of the housing 16 is also to be made of plastic and formed by injection molding, while the contacts 17 and 18 are made of a conductive metal, such as beryllium copper and inserted into the plastic part during the molding process. The assembly of the sensor is completed by combining the two parts of the housing. With an appropriate metal to plastic adhesive coating on the metal, the metal parts and the plastic can be bonded so as to maintain a seal throughout the operating temperature range of the sensor.

A major difference between a disk flapper disclosed in this invention and a typical ball-in-tube sensor, as shown in U.S. Pat. Nos. 4,329,549, 4,573,706, and 4,715,617 of D. S. Breed, is the damping effect provided by the gas flow. The gas flow in this invention is generally of inertial type, therefore, the resisting force caused by the pressure difference is proportional to the second power of the gas velocity. Viscous damping utilized in ball-in-tube sensors, on the other hand, is linearly proportional to the gas velocity. Inertial type damping is not dependent on the viscosity, and is therefore insensitive to temperature changes, assuming that the sensor is sealed and gas density is kept constant.

Inertial gas damping is achieved when the restrictor through which the gas flow has a length which is short compared with the gap thickness of the opening. A sharp edge orifice is an example as is the clearance between the wall and flapper in FIG. 1. For this case inertial effects dominate over viscous effects if the Reynolds Number based on the thickness of the opening is greater than 1. As the length of the flow path increases, a viscous boundary layer builds up and finally a parabolic flow distribution develops and viscous forces dominate over inertial forces. Finally, even for a long tube, as the gas velocity increases and the Reynolds Number gets larger than about 2000, turbulent flow occurs and once again inertial forces dominate over viscous forces. Most of the embodiments shown in this invention make use of flow similar to inertial flow through a sharp edge orifice. In the cases shown in FIG. 3A and FIG. 3B the piston is made thicker and the sharp edge is replaced by a curved surface which can be designed so that viscous flow results. This is similar to the ball-in-tube sensor shown in Breed U.S. Pat. No. 3,974,350.

The motion of the flapper is determined by the bias, the damping force, and the inertial force caused by the crash pulse. The flapper size of the preferred embodiment is in the range of 1 to 2 inches, which is much larger than the diameter of the ball in a ball-in-tube sensor, which is typically less than 0.5 inch. A ball-in-tube sensor has a very small radial clearance, usually between 0.0007 and 0.001 inches, and thus has very tight manufacturing tolerances on the ball and tube dimensions. With the large size, the clearance is much larger, usually between 0.002 and 0.005 inches, and thus easier to manufacture. This large clearance is therefore very significant in the design and manufacturing of this sensor. It reduces the sensitivity to, and the manufacturing tolerances of, the clearance between the flapper and the housing, and thus makes it possible to use plastic. The size of the clearance can be determined by those skilled in the art of computer modeling wherein a model of the sensor is created and run varying the parameters, such as the clearance, until the desired response curve is achieved.

Figure 2:
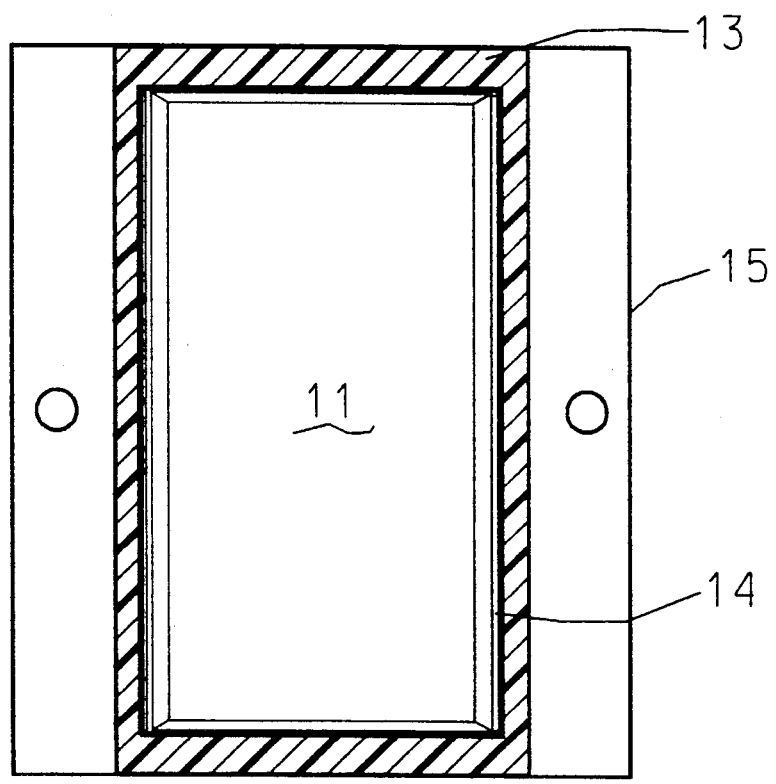
FIG. 2 is a cross section view taken along lines 2—2 of FIG. 1.

FIG. 2 is a cross section view of the sensor of FIG. 1 taken along lines 2—2.

An inertially-damped sensor is naturally more sensitive to long duration pulses since the gas velocity is less and the flow resistance is proportional to the second power of the gas velocity. For this reason the sensor sensitivity to velocity change for long pulses must be adjusted by the bias level. A computer program simulating the motion of the flapper is used to analyze and determine the appropriate dimensions and the bias level. The bias level is typically about 5 to 10 G's for discriminating sensors and 1 to 4 G's for arming or safing sensors.

Figure 3:
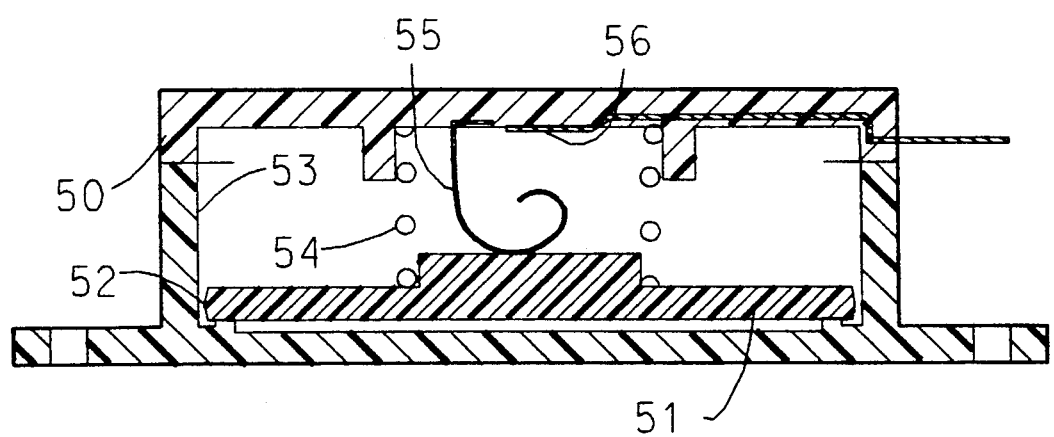
FIG. 3A is a viscously damped disk sensor with a relatively large diameter and a short travel having a spring bias.
FIG. 3B is a viscously damped disk sensor with a relatively large diameter and a short travel as in FIG. 3A except with a magnetic bias.
Figure 3A:
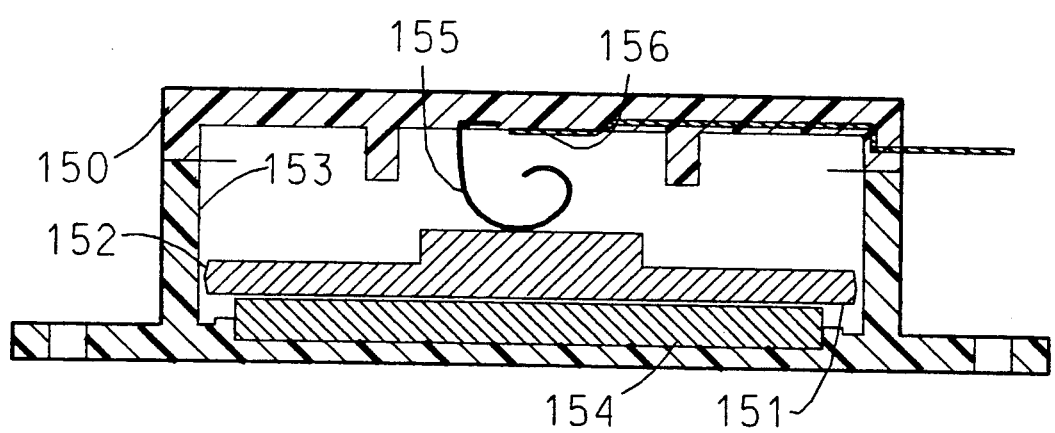

FIG. 3A depicts a viscously damped sensor 50 adapted to be used for passenger compartment sensing. A disk 51 with arc edge 52 is arranged to move in a housing 53. Although a spring 54 is shown providing the biasing force, this bias could also be provided by a magnet as shown in FIG. 3B. In FIG. 3B the same numbers refer to unchanged parts. Magnet 154 performs the same function in FIG. 3B as spring 54 in FIG. 3A. Sensing mass 154 in FIG. 3B is made from a magnetically permeable material such as iron and is preferably made by sintering. Sensing mass 54, on the other hand is made from plastic and is molded. Contacts 55 and 56 will close an electrical circuit if the disk moves to a specified position. Due to the tight clearance and the large area on the arc edge, the flow through the clearance when the disk is moving is of viscous type. Such gas flow can provide a damping force linearly proportional to the velocity of the disk. Naturally, as for any viscously damped sensor, means must be provided to compensate for the change in the gas viscosity with temperature. Such means could employ the use of materials with different thermal expansion coefficients for the disk and housing.

Figure 4:
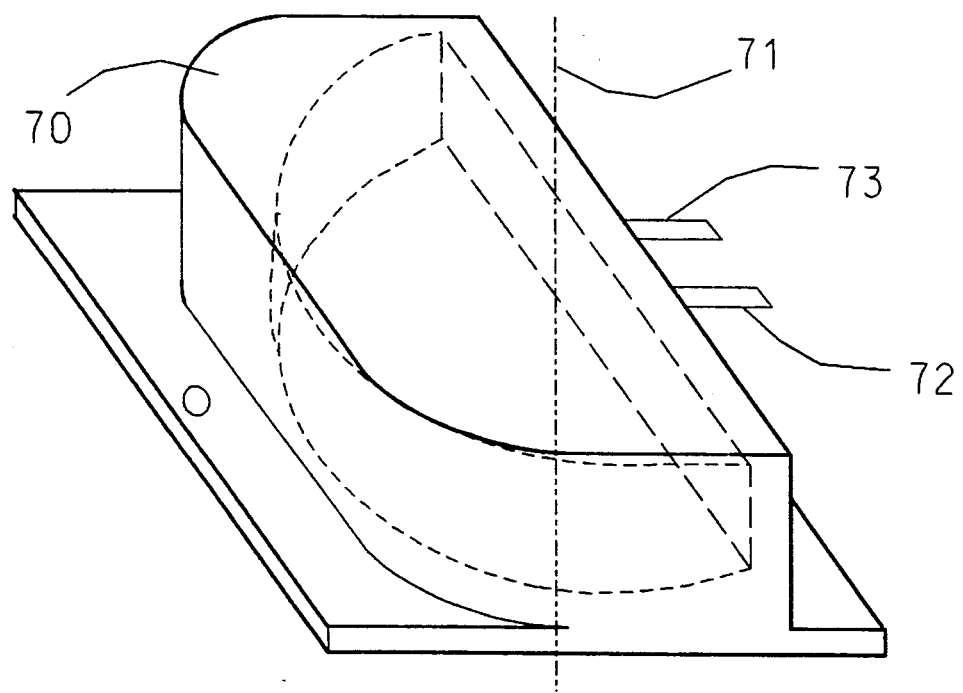
FIG. 4 depicts an embodiment of a sensor of this invention with a semi-circular disk geometry.

FIG. 4 is a perspective view of another preferred embodiment of a crash sensor of this invention. Sensor 70 is installed on a vehicle with axis 71 parallel to the desired crash detecting direction. Leads 72 and 73 are extensions of contacts inside the sensor. These leads are connected to an electrical circuit, which is used to initiate the operation of a protection apparatus associated with the sensor when the sensor is triggered by a crash pulse.

Figure 5:
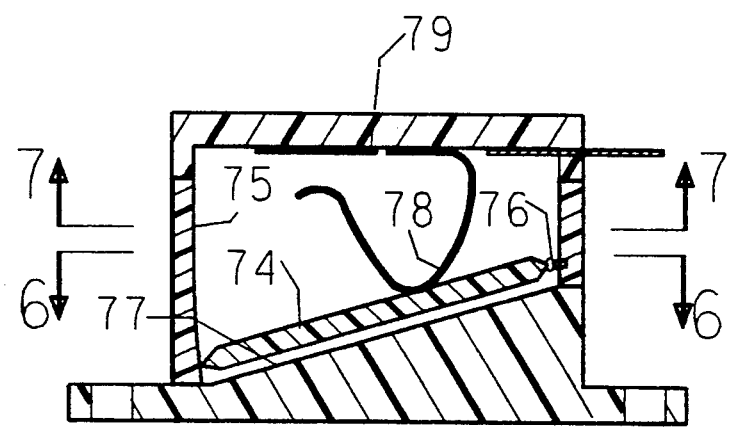
FIG. 5 illustrates the side cross-sectional view of the sensor in FIG. 4 taken along line 5—5.

FIG. 5 is a cross-sectional view taken along line 5—5 of the sensor shown in FIG. 4. The sensor comprises a disk 74 and a housing 75. Disk 74 is coupled with housing 75 by a hinge 76. Disk 74 initially rests on a surface 77 and is biased toward the initial position by a biasing spring 78. The bias spring also acts as a first contact. Another contact 79 is located on a second location inside the housing.

Figure 6:
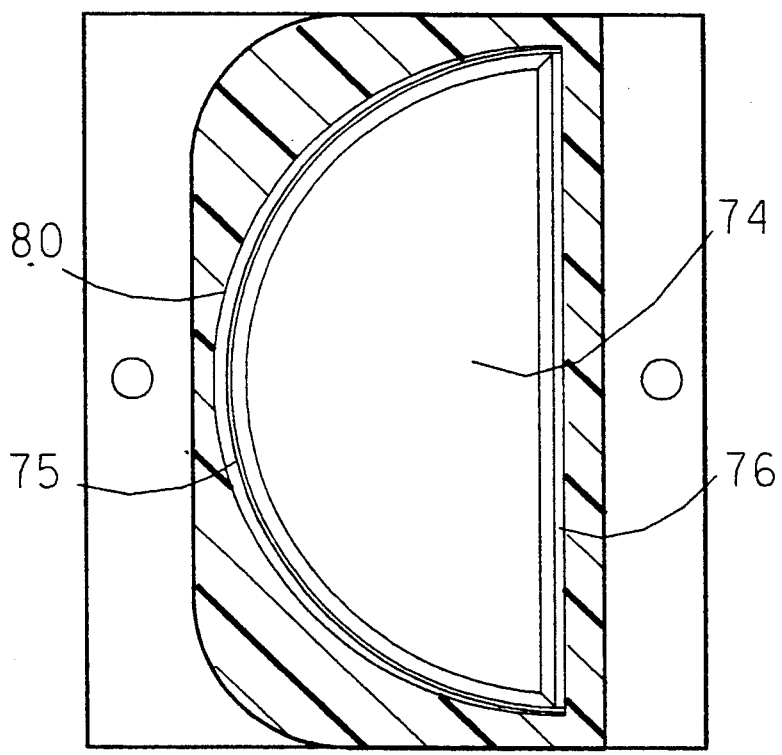
FIG. 6 is a cross-sectional view of the sensor in FIG. 4 taken along line 6—6 of FIG. 5.

Another cross sectional view of the sensor, shown in FIG. 6, is taken from line 6—6 of FIG. 5 and clearly demonstrates the geometries of the semi-circular disk 74 and the semi-circular housing 75. Hinge 76 connects disk 74 to housing 75. The clearance 80 between the disk and the housing controls the damping effect on the motion of the disk.

Figure 7:
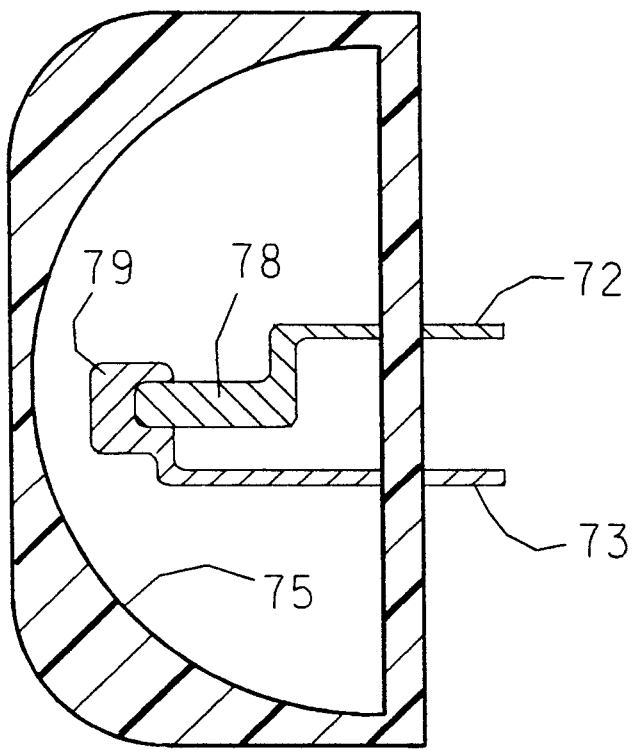
FIG. 7 is another cross-sectional view of the sensor in FIG. 4 taken along line 7—7 of FIG. 5.

FIG. 7 is another cross-sectional view of the sensor taken from the direction of line 7—7 shown in FIG. 5. This drawing shows the semi-cylindrical passage 75, the contacts 78 and 79, and the leads 72 and 73 extending from the contacts.

If a crash occurs, disk 74 moves toward contact 79. If the crash is of enough magnitude and duration, disk 74 pushes contact 78 toward contact 79 and closes a circuit. Contact 78 is flexible so that disk 74 is allowed to move further after the contacts are closed. This travel after contact is important for a sensor to maintain contact after the sensor has triggered and to provide a long duration of contact closure. During the motion of the disk 74, gas flows around the disk through the clearance 80 and introduces a damping effect on the motion of the disk.

Figure 8:
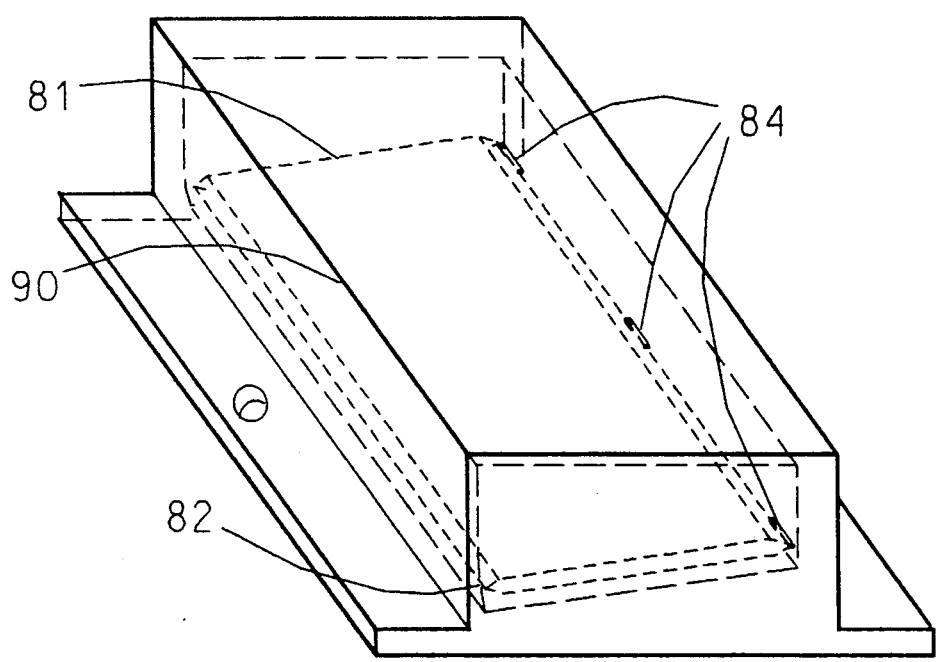
FIG. 8 is another embodiment of a sensor of this invention with a rectangular disk geometry.

FIG. 8 is a perspective view of another embodiment of this invention. Sensor 90 comprises a rectangular disk 81 indicated by the dashed lines in FIG. 8. The curved surface 82 constitutes a portion of the passage inside the sensor.

Figure 9:
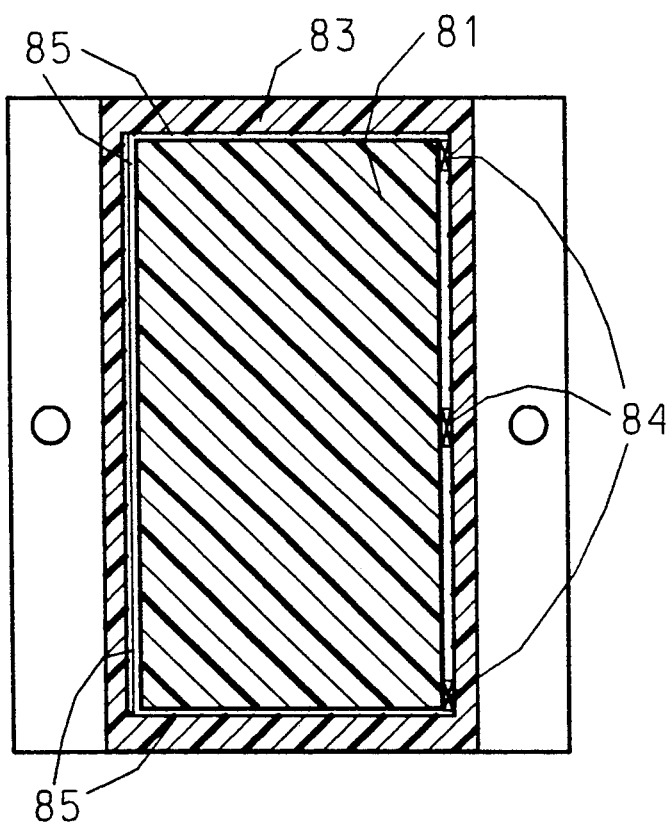
FIG. 9 illustrates the side cross-sectional view of the sensor in FIG. 8 taken along line 9—9.

FIG. 9 is a cross-sectional view of the sensor shown in FIG. 8. The disk 81 is coupled to the housing 83 by three hinges 84 along one edge of the disk instead of a continuous hinge as is the case of FIG. 6. In this case, the hinges are preferably made from metal and insert molded into the body and flapper. The gap 85 between the disk 81 and the housing 83 along the other three edges of the disk 81 is the orifice which restricts the gas flow.

Figure 10:
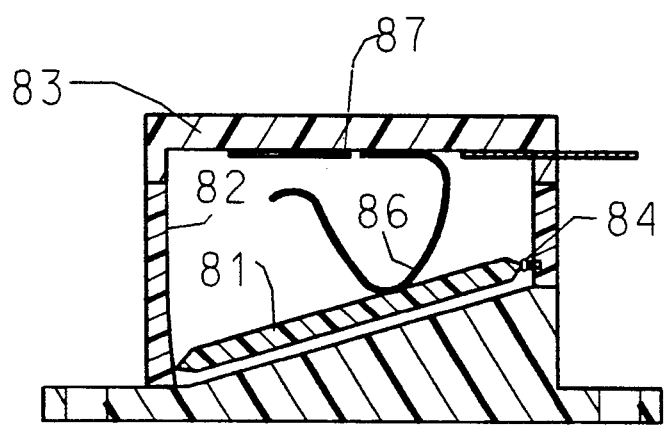
FIG. 10 is a cross-sectional view of the sensor in FIG. 8 taken along line 10—10.

FIG. 10 is a side view of the sensor in FIG. 8. The interior of housing 83 is designed to match the shape of the disk. The inner surface 82 of housing 83 is curved. With this interior geometry, the orifice area can be kept constant throughout the travel range of disk 81. The uniform orifice feature provided by the geometry of sensor 90 will allow a maximum clearance to be used for the same total amount of damping.

The functions of contacts 86 and 87 are similar to those of contacts 78 and 79 described in FIG. 5. Naturally more than one pair of contacts could be used within one sensor. With the rectangular shape of the flapper, it is easier to allocate spaces for multiple sets of contacts. Dual contacts may be desirable for a safing sensor where separate switches for driver-side and passenger-side gas bag systems are sometimes desired.

The rectangular geometry of the disk of sensor 90 also provides a greater flexibility of choosing dimensional ratio of height to width, while the semi-circular disk has a fixed 1-to-2 ratio of height-to-width. Such flexibility allows the selection of dimensions to accommodate the sensor on desired locations on a vehicle.

An example using the rectangular disk geometry is investigated for simulating a safing sensor to be installed in the passenger compartment.

| | |
|---|---|
| mass (disk) = | 3 grams |
| disk height = | 1.0 inches |
| disk width = | 1.0 inches |
| clearance = | 0.010 inches |
| initial disk position = | −10 degrees (counter clockwise from vertical position) |
| triggering position = | −4 degrees (counter clockwise from vertical position) |
| disk travel limit = | +12 degrees (clockwise from vertical position) |
| initial bias = | 0.5 G's |
| average bias = | 1.7 G's |

If the simulation of the sensor is conducted with haversine pulses of different duration, the sensor with the above parameters is found to marginally trigger at:

| PULSE DURATION (MS) | VELOCITY CHANGE (MPH) |
|---|---|
| 10 | 0.90 |
| 20 | 0.95 |
| 30 | 1.09 |
| 40 | 1.20 |
| 50 | 1.39 |

Since this sensor has a marginal velocity change of 0.9–1.4 MPH in the range of 10–50 milliseconds, it is a candidate for a safing sensor.

The above two embodiments of FIG. 4 and FIG. 8 illustrate the principle of this invention. Although the semi-circular and the rectangular geometries are demonstrated here, the invention is not restricted by these two shapes. As long as the interior of the housing is tailored to fit the shape of the disk, other geometries can be used to fully accomplish the purposes of this invention.

Figure 12:
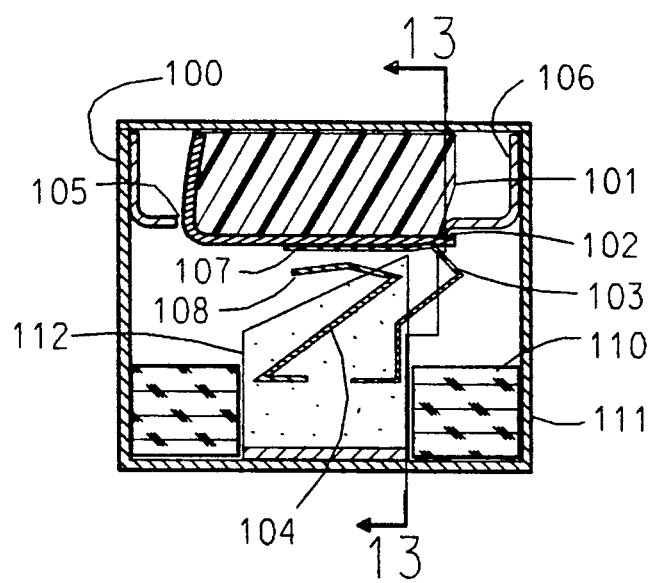
FIG. 12 is a cross section view of a testable arming sensor illustrating a knife edge hinge.

FIG. 12 depicts an alternate preferred design of an inertial flow passenger compartment crash sensor which is manufactured from metal and is testable. Some automobile manufacturers have a requirement that crash sensors be testable. At some time, usually during the start up sequence, an electronic circuit sends a signal to the sensor to close and determines that the contacts did close. In this manner, the sensor is operated and tested that it is functional. The testable sensor 100 of FIG. 12 consists of a metal flapper 101 which is hinged using a knife edge hinge 102. The flapper 101 is held against knife edge 102 by a contact and support spring 103 which exerts both a horizontal force and a bias moment onto the flapper. (Horizontal is taken relative to the vehicle and is actually vertical in FIG. 12 where arrow B denotes the direction toward the front of the vehicle). During operation, flapper 101 is acted upon by inertial forces associated with the crash and begins rotating around pivot 102. A small motion of the flapper however, expands the gas behind it creating a pressure drop which resists the motion of the flapper. This pressure drop is gradually relieved by the inertial flow of the gas through the clearance 105 between flapper 101 and orifice plate 106. If the crash is of sufficient severity, flapper 101 rotates until contact 107 of contact spring 103 contacts contact 108 of contact spring 109 and completes the electrical circuit initiating the occupant protective apparatus. Once contact is made, the flapper 101 can continue to rotate for an additional amount sufficient to assure that the contact dwell is long enough to overlap with the discriminating sensor and provide enough current to ignite the squib which initiates the gas generator which, in turn, inflates the air bag.

Testing is achieved by applying a current, typically less than 2 amps, to the coil 110. When the current is present, a magnetic circuit composed of the metal housing 111, pole 112, orifice plate 106 and flapper 101, leads the flux lines so as to create an attractive force between the pole 112 and the flapper 101 drawing the flapper into contact with the pole and causing contact 107 to contact contact 108 and complete the circuit. In one embodiment, the coil consisted of 300 turns of 20 gage wire. It drew about 2 amps of current at 9 volts.

Figure 13:
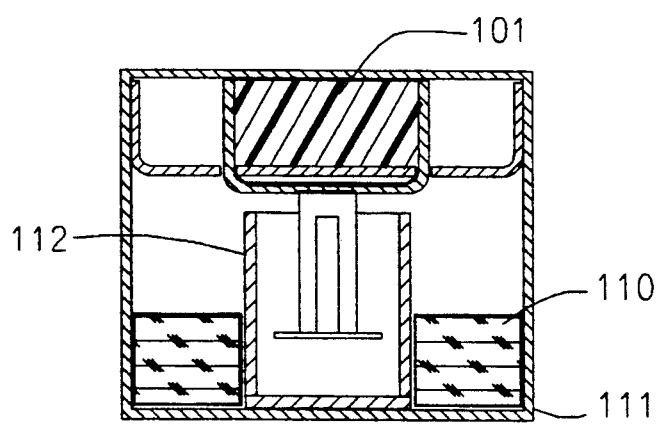
FIG. 13 is a view along lines 13—13 of FIG. 12.

FIG. 13 is a view through the sensor of FIG. 12 along lines B—B.

Although a damped sensor has been illustrated for use as an arming sensor, this damping may not be necessary for some applications where a slightly shorter contact duration can be tolerated. If the damping is not required, the clearance between the flapper and housing can be made much larger resulting in a pure spring mass sensor. Such a sensor would be less expensive to manufacture.

In the preferred embodiments mentioned above, the hinge connecting the flapper and the housing can be constructed in several ways. If the same plastic material used for both the flapper and the housing is suitable for the hinge and the thickness of the hinge is manufacturable by the molding process, then the hinge, the flapper and the housing can be formed in the same process by the same plastic material. An alternate way is to form the hinge from a metal or a different higher melting plastic and insert the hinge into the plastic part in the molding process. In this case, the bending stiffness of the hinge could also be used for biasing. An example of producing such a sensor is illustrated in FIGS. 11A, 11B and 11C.

FIG. 11A shows the contacts 201 and 202 as formed before insertion into the mold. FIG. 11B shows the contacts molded into a single, extended piece 203 with the plastic parts 204, 205, 206, and 207 of the sensor. FIG. 11C shows the sensor in its final shape with the parts 204 and 207 bent into their proper positions. The side surfaces 204 and 207 are fused or welded into the housing 205 to form an hermetically sealed sensor 200. Part 206 becomes the flapper, and conductor 201 serves as both a contact and a hinge. In this example, no additional bias spring is needed because conductor 201 works as a cantilever beam, providing the required biasing force.

Figure 11:
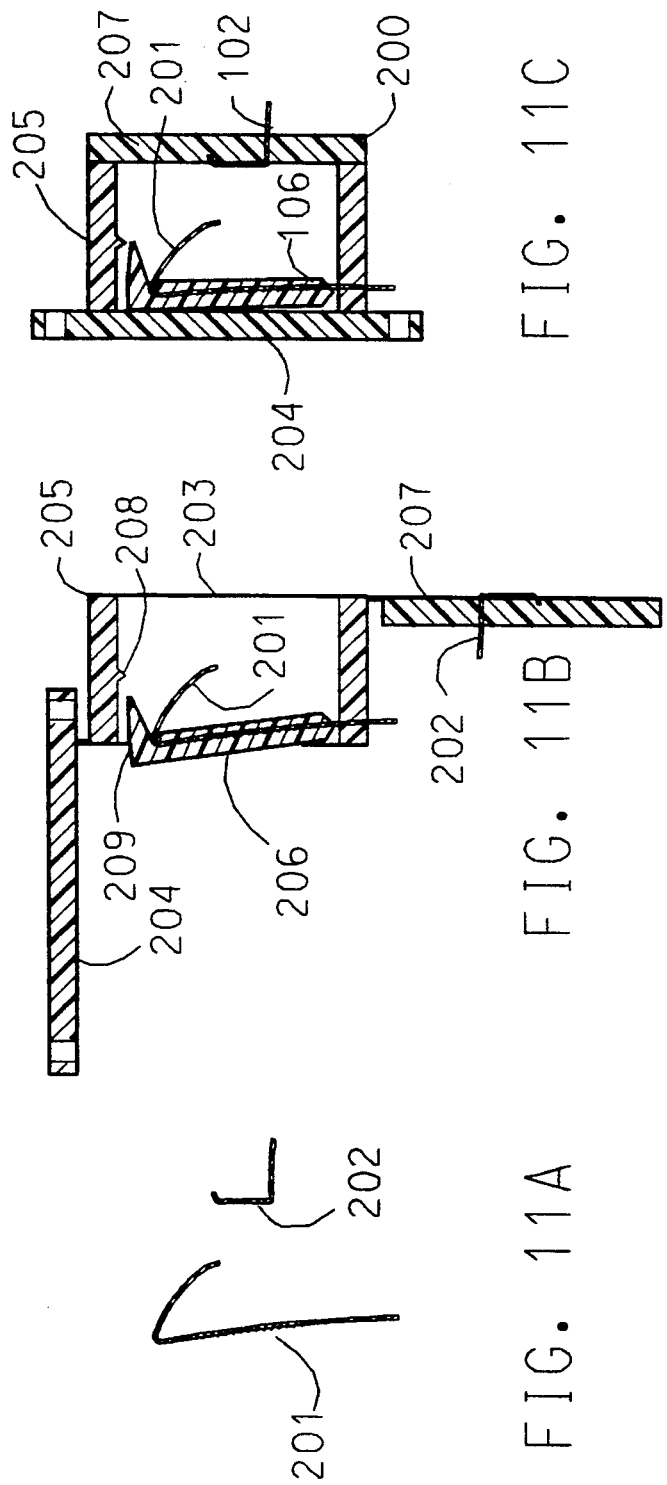
FIGS. 11A-11C illustrate a procedure of manufacturing a crash sensor.

A sharp edge 208 is formed on the upper interior of housing 205 as shown in FIG. 11, while the upper edge 209 of flapper 206 is smoothly profiled. Inertial gas flow is made possible by the sharp edge 208 although the surface 209 of flapper 206 has a cylindrical profile to mate with edge 208. The sides of flapper 206, on the other hand, are flat to mate with the corresponding portions of edge 208 always maintaining a constant clearance around the flapper 208. This option is necessary when a sharp edge of the flapper is difficult to produce in a molding process.

It is another feature of some embodiments of this invention to use plastic as the main material for crash sensors. The flapper, hinge, and housing can be made of the same plastic material by a molding process. Alternatively, the hinges can be made of metal of another higher melting plastic and then insert molded with the plastic parts. Metal contacts can be inserted into the housing in the same molding process. Thus, the manufacturing is simplified and minimal additional assembly is needed.

This also permits a much tighter control over the dimensions of the clearance. Plastic materials vary in their properties from batch to batch and parts made from different cavities within a multi cavity mold also show some dimensional variation. Joining the mating parts together during the molding process, assures that the flapper and its mating housing will be formed from the same batch of plastic at the same temperature and from the same cavity which has been carefully tested to yield a pair of parts with the required clearance.

In U.S. Pat. No. 3,522,575 of Watson et al, an adhesive coating is applied to conductive materials and thus hermetical sealing is obtained between the conductor and the plastic for electrical connectors. The coating material mentioned in that patent is a phenolic resin with 6 percent content of polyvinyl chloride. Sealing is very critical to the operation of crash sensors. The interior of a crash sensor must be protected from dust and moisture to avoid malfunctioning. The current technique used to seal sensors includes surrounding the sensor by a sand-epoxy mixture. This technique is not reliable, is expensive and adds a great deal of weight to the sensor.

If the technique of metal-plastic coating is appied to crash sensors as suggested in this invention, the bonding between the conductor and the plastic of a sensor can be insured within the operating temperature range for crash sensors, which is usually specified at from −40 F. to 250 F. Not only crash sensors, but also many other devices containing electrical conductors used on vehicles, will benefit from this application of bonding between conductors and plastics. Such bonding can be provided by a resilient coating material, such as the one disclosed in the patent of Watson et al.

Although several preferred embodiments are illustrated and described above, there are possible combinations using other geometries, materials and different dimensions of the components that can perform the same function. Therefore, this invention is not limited to the above embodiments and should be determined by the following claims.

What is claimed is:

1. A crash sensor adapted for mounting in the passenger compartment of a vehicle comprising:
    (a) a housing;
    (b) a planar sensor mass disposed in said housing and arranged to move between a first position and a second position, said housing and said mass being profiled to define a narrow clearance between them;
    (c) means of biasing said mass toward a first position in said housing;
    (d) first and second contacts;
    (e) means of causing said first contact to contact said second contact when said mass moves to a second position in said housing;
    (f) means to dampen the motion of said mass relative to said housing, said damping means comprising the flow of a gas thorough said clearance; and
    (g) means for flexibly connecting said mass to said housing in a manner permitting said mass to rotate relative to said housing about a point of connection.

2. The invention in accordance with claim 1, wherein said planar mass is a component, of which the thickness is much smaller than the width or the height.

3. The invention in accordance with claim 1, wherein said mass is connected with said housing by at least one hinge.

4. The invention in accordance with claim 3, wherein said mass, said housing, and said hinge are made of plastic and formed in a molding process.

5. The invention in accordance with claim 3, wherein said housing is made of plastic and said hinge is made of metal and molded into said housing.

6. The invention in accordance with claim 5, wherein said hinge provides a biasing force.

7. The invention in accordance with claim 1, wherein said mass is semi-circular.

8. The invention in accordance with claim 7, wherein said mass is attached to said housing at least partially along its diameter.

9. The invention in accordance with claim 1 wherein said mass is rectangular.

10. The invention in accordance with claim 9, wherein said mass is attached to said housing at least partially along one its edges.

11. The invention in accordance with claim 1, wherein said housing is tailored to maintain a substantially constant clearance between said mass and said housing throughout the moving range of said mass.

12. The invention in accordance with claim 1, wherein said means of biasing comprises a spring.

13. The invention in accordance with claim 12, wherein said contacts are treated to become adhesive to plastic prior to the molding operation so as to prevent separation between said contacts and said housing within the operating temperature range of said sensor.

14. The invention in accordance with claim 13, wherein said treatment provides hermetical sealing to said sensor.

15. The invention in accordance with claim 1, wherein said means of biasing comprises a magnet.

16. The invention in accordance with claim 1, wherein said first and second contacts are combined with said housing in a molding process.

17. The invention in accordance with claim 1, wherein said first contact provides a biasing force for said mass.

18. A crash sensor adapted for mounting in the passenger compartment of a vehicle comprising:

(a) a housing; '(b) a mass in said housing;
(c) means of biasing said mass toward a first position in said housing;
(d) means responsive to the motion of said mass to a second position in said housing;
(e) means to connect said mass to said housing to permit said mass to rotate relative to said housing, said connection means comprising a knife edge.

* * * * *